Oct. 31, 1944.  A. O. CALHOON  2,361,598
POULTRY FEEDER
Filed Feb. 11, 1943  2 Sheets-Sheet 1

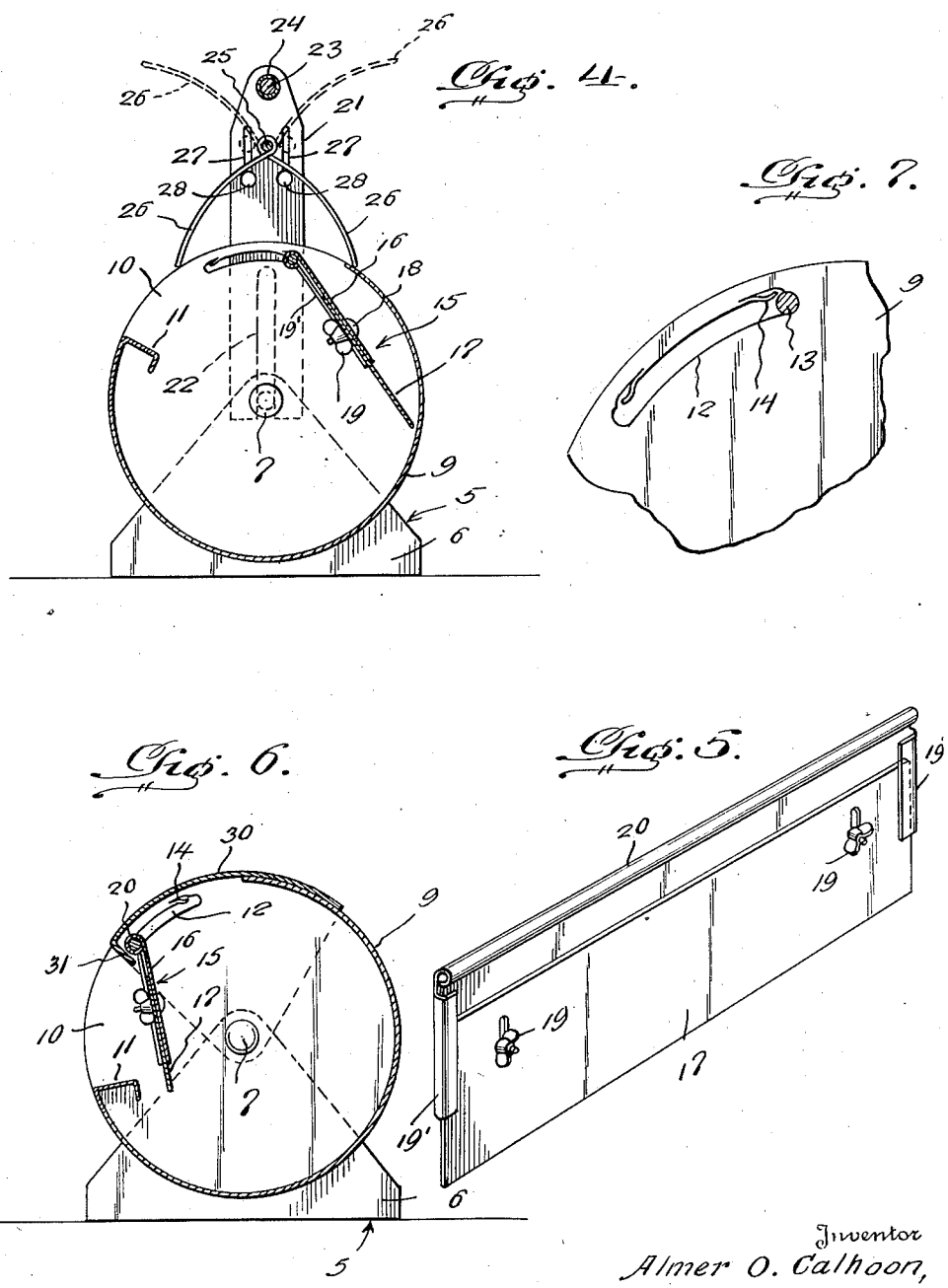

Inventor
Almer O. Calhoon,
By McMorrow and Berman
Attorneys

Patented Oct. 31, 1944

2,361,598

UNITED STATES PATENT OFFICE 2,361,598

POULTRY FEEDER

Almer O. Calhoon, Stoutsville, Mo.

Application February 11, 1943, Serial No. 475,547

2 Claims. (Cl. 119—61)

This invention relates to a poultry feeder either for dry or wet feed, and has for the primary object the provision of a device of this character which may be easily and quickly adjusted for feeding either grown or baby fowls or fowls of any age or maturity, the construction of the device being such that the fowl regardless of size or age will not waste the feed when eating therefrom and will be prevented from depositing foreign materials into the device or the mixing thereof with the feed and also to a great extent protect the feed from weather elements.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a front elevation illustrating a poultry feeder constructed in accordance with my invention.

Figure 4 is a transverse sectional view illustrating the device adjusted for feeding grown fowls.

Figure 5 is a perspective view illustrating an adjustable partition.

Figure 6 is a transverse sectional view illustrating a modified form of my invention.

Figure 7 is a fragmentary transverse sectional view illustrating one of the end walls of the feed hopper and a slot therein for receiving a hinge rod of the adjustable partition.

Figure 1:
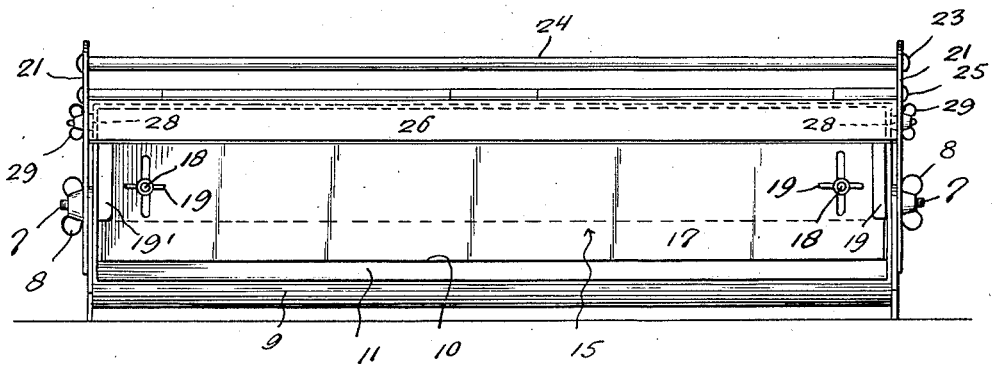

Referring in detail to the drawings, the numeral 5 indicates as an entirety the support of the device and consists of a pair of spaced end plates 6 each of substantially triangular shape and disposed vertically and connected by a journal rod 7, the ends of which are screw threaded to receive wing nuts 8. The journal rod 7 rotatably supports a cylindrical shaped hopper 9 provided with an entrance 10 extending substantially the full length thereof.

By adjusting the wing nuts 8 on the journal rod, the supporting plate 6 will be caused to bear against the end walls of the hopper and thereby secure the latter against rotation. This construction permits the entrance 10 to be raised and lowered with respect to the ground for the purpose of permitting different size fowls to be able to eat directly from the interior of the hopper. The feed may be either dry or wet.

In constructing the entrance to the hopper, a portion of the material is bent inwardly and downwardly, as shown at 11, to form a guard over which the fowl must reach in eating the feed from the hopper. This guard will tend to prevent the feed from spilling from the entrance during the time the fowls are eating from the hopper.

The end walls of the hopper 9 are provided with arcuately curved slots 12 to slidably receive a partition supporting rod 13. The walls of the slots adjacent the ends are cut away to form resilient tongues 14 lying within the slots and acting to retain the rod 13 at either end of the slots. Said tongues are capable of flexation to permit the rod 13 to be moved from end to end of the slots.

The ends of the slots 12 are reduced so that the rod 13 frictionally fits the end walls of the slots to act as a retard against the rotation of the rod on which is mounted a partition 15. The employment of the rod 13 in the slots 12 and the partition carried by the rod, permits the partition to be adjusted relative to the guard 11 for the purpose of regulating the width of the opening between said guard 11 and partition and through which the fowls reach the feed within the hopper. Relocating the rod 13 from one end of the slots 12 to the other end varies the location of the partition with respect to the entrance 10, so as to arrange the device for feeding either young or grown fowl as suggested in Figures 3 and 4 of the drawings. When the device is adjusted for feeding fowls of mature age, the partition 15 is adjusted into the position as shown in Figure 4 and the entire hopper is rotated so as to raise the entrance 10 upwardly.

To feed young or small fowls, the hopper is rotated in a reverse direction bringing the guard 11 at the lower end of the entrance 10 closer to the ground and the rod 13 may be adjusted along the slots to the opposite ends thereof if desired.

The partition 15 is of sectional formation, consisting of sections 16 and 17 slidably connected by bolts 18 having wing nuts 19. The bolts extend through slots in the section 17 whereby the section 17 may be adjusted on the section 16 to increase and decrease the width of the partition. The section 16 may have on the ends thereof guide flanges 19 slidably receiving the end edges of the section 17. One longitudinal edge of the section 16 of the partition is rolled on itself to form a hinged barrel 20 that frictionally receives the rod 13. The friction between the barrel 20 and the rod 13 may be manually overcome whenever it is desired to adjust the partition on the rod by rotating the partition relative to the rod.

End plates 21 are provided with slots 22 to receive the journal rod 7 and normally lie between the wing nuts 8 and the end supporting plates 6. The plates 21 are of elongated formation and extend vertically and terminate a distance above the hopper and are connected by a tie rod 23 on which a sleeve is journaled and forms a rotatable handle 24 for the device. By having the handle rotatably mounted fowls will be prevented from roosting on the handle.

The end plates 21 are further connected by a tie rod 25 on which are journaled oppositely extending arcuately curved cover members 26, the free longitudinal edges of which ride the peripheral wall of the hopper and the periphery of the end walls of said hopper where the entrance 10 occurs. The hinged formation of the cover members 26 with the rod 25 is of the frictional type requiring manual effort to move the cover from one position to another. The cover members may be caused to assume the dotted line position, as shown in Figure 4, when desiring to fill the hopper with feed or for the purpose of making adjustments to the partition or for cleaning the interior of the hopper. The end members 21 may be provided with slots 27 in which are mounted bolts 28 and nuts 29 to permit the bolts to be adjusted in the slots for the purpose of maintaining the cover members elevated, as shown in dotted lines in Figure 4, or for allowing the cover members to move into engagement with the hopper.

Figure 3:
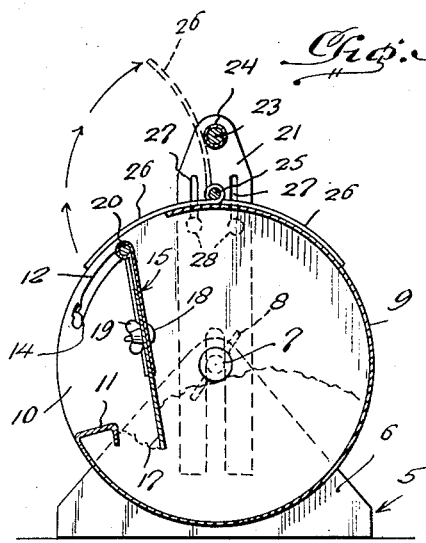
Figure 3 is a transverse sectional view showing one of the covers of the device positioned in dotted lines to permit filling of the device with feed.

Figures 3 and 4 clearly show how the relative positions of the cover members may be varied on the hopper.

In Figure 6 a modified form of the invention is disclosed wherein the cover members, handle 24 and end members 21 are omitted and the entrance of the hopper is controlled by a slidable cover plate 30 having one longitudinal edge bent at right angles to extend into the hopper, as shown at 31, by way of the entrance 10. The cover plate 30 may be slidably mounted on the hopper in any suitable manner such as providing end portions apertured to receive the journal rod 7.

From the foregoing description taken in connection with the accompanying drawings, it will be seen that a very efficient feeding device has been provided for fowl regardless of the age of the fowl or size of the fowl and may be readily adjusted to permit the different age fowls fed by the device to conveniently reach the feed within the hopper from a standing position exteriorly of the hopper. Also, it will be seen that the space for obtaining feed from the hopper by the fowl can be readily varied to make it convenient for the large or small fowl to feed from the device without spilling or otherwise wasting feed.

A device of the kind shown and described in the foregoing is simple in construction, economical to manufacture and may be sold at a low cost.

Figure 2:
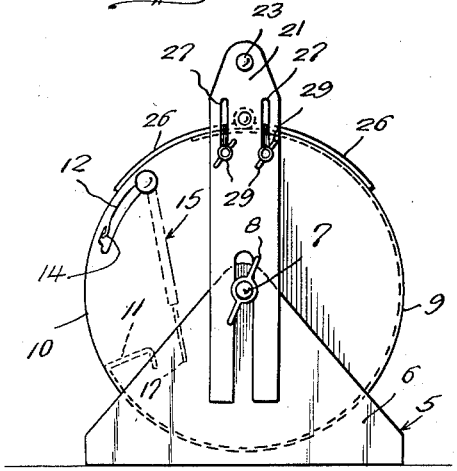
Figure 2 is an end elevation illustrating the device adjusted for feeding baby fowls.

With the parts of the device positioned as shown in Figures 2 and 3 and when the hopper 9 is filled with grain, the device becomes a self-feeder as poultry or the like can eat readily therefrom and the feed will be self-replenishing to the outlet from the hopper. When the device has the parts positioned as shown in Figure 4, the device becomes an open type feeder.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a poultry feeder, a rotatably mounted cylindrical shaped hopper including a tubular wall provided with an entrance extending substantially the full length thereof and end walls integral with the tubular wall and provided with arcuately curved slots located at the ends of the entrance, a rod slidable in the slots, a partition frictionally mounted on said rod and capable of being rotated thereon, and flexible tongues struck from the end walls of the hopper and extending into the slots adjacent the ends of said slots to engage and releasably secure the rod in the ends of the slots for the adjustment of the partition relative to opposite edges of the entrance.

2. In a poultry feeder, a cylindrical shaped hopper including a tubular wall provided with an entrance extending substantially the full length thereof and end walls integral with the tubular wall and provided with arcuately curved slots located at the ends of the entrance, a rod slidable in the slots, a partition mounted on said rod and capable of being rotated thereon, and flexible tongues struck from the end walls of the hopper and extending into the slots adjacent the ends of said slots to engage and releasably secure the rod in the ends of the slots for the adjustment of the partition relative to the opposite edges of the entrance, said partition including adjustably connected sections for varying the width thereof and having one section thereof frictionally journaled on the rod.

ALMER O. CALHOON.